United States Patent
Beers et al.

(10) Patent No.: US 9,341,193 B2
(45) Date of Patent: May 17, 2016

(54) CABIN AIR COMPRESSOR DIFFUSER VANE DRIVE RING

(71) Applicant: Hamilton Sundstrand Corporation, Windsor Locks, CT (US)

(72) Inventors: Craig M. Beers, Wethersfield, CT (US); Seth E. Rosen, Middletown, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 498 days.

(21) Appl. No.: 13/856,504

(22) Filed: Apr. 4, 2013

(65) Prior Publication Data

US 2014/0301830 A1    Oct. 9, 2014

(51) Int. Cl.
*F01D 17/12* (2006.01)
*F04D 29/46* (2006.01)
*F16C 35/00* (2006.01)

(52) U.S. Cl.
CPC ............... *F04D 29/462* (2013.01); *F16C 35/00* (2013.01)

(58) Field of Classification Search
CPC ..... F04D 29/462; F04D 29/444; F16C 35/00; F05D 2260/56; F05D 2220/50
USPC ........................... 415/148, 150, 160; 384/428
See application file for complete search history.

(56) References Cited

U.S. PATENT DOCUMENTS

| | | | |
|---|---|---|---|
| 4,844,690 A | 7/1989 | DeLaurier et al. | |
| 5,207,559 A | 5/1993 | Clevenger et al. | |
| 6,139,262 A | 10/2000 | Ravidranath | |
| 6,158,956 A | 12/2000 | Arnold | |
| 6,361,432 B1 | 3/2002 | Walker | |
| 6,872,050 B2 | 3/2005 | Nenstiel | |
| 7,407,367 B2 * | 8/2008 | McAuliffe | F04D 29/462 415/148 |
| 2010/0054923 A1 * | 3/2010 | Beers | F04D 25/06 415/150 |
| 2012/0020776 A1 * | 1/2012 | Colson | F04D 29/462 415/150 |
| 2012/0107101 A1 | 5/2012 | Telakowski et al. | |
| 2012/0114463 A1 | 5/2012 | Beers et al. | |

* cited by examiner

*Primary Examiner* — Jesse Bogue
*Assistant Examiner* — Kelsey Stanek
(74) *Attorney, Agent, or Firm* — Carlson, Gaskey & Olds, P.C.

(57) ABSTRACT

A cabin air compressor drive ring includes an outer ring defining an axis, an inner ring co-axial with the outer ring, a plurality of webbings connecting the inner ring to the outer ring, and a plurality of vane engagement pins axially protruding from the outer ring. The vane engagement pins are spaced circumferentially about the outer ring, and the inner ring includes a drive ring bearing interface.

19 Claims, 4 Drawing Sheets

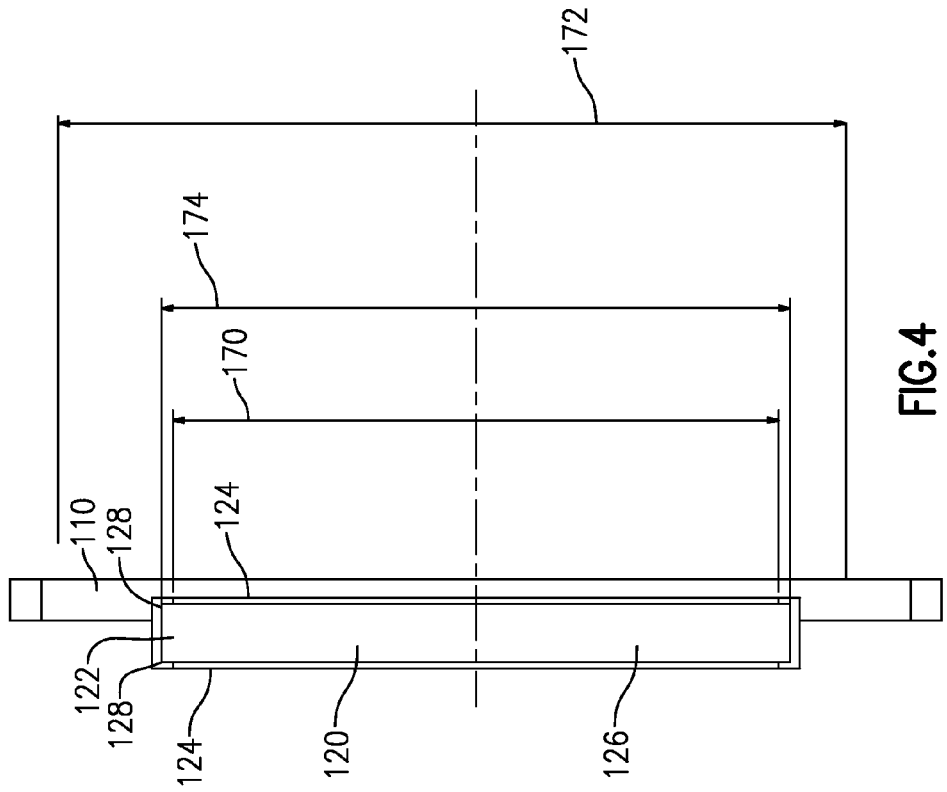
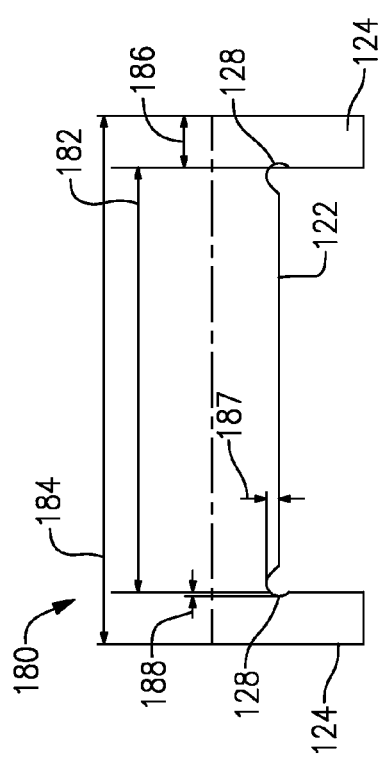
FIG.4
FIG.5

CABIN AIR COMPRESSOR DIFFUSER VANE DRIVE RING

TECHNICAL FIELD

The present disclosure relates generally to air compressors, and more specifically to a diffuser vane drive ring for use in an air compressor.

BACKGROUND OF THE INVENTION

Air compressors are used in multiple applications on standard commercial aircraft. One such application is providing pressurized air to a passenger cabin, or other pressurized compartment of the aircraft. Air compressors performing this function are typically referred to as "cabin air compressors".

In some aircraft applications it is desirable for the volume of air passing through the cabin air compressor to be controlled. In one method of implementing this control, the cabin air compressor includes multiple rotatable vanes that increase or decrease the size of the opening in a gas flow passage connecting a gas inlet of the compressor to the gas outlet of the compressor.

SUMMARY OF THE INVENTION

Disclosed is a cabin air compressor drive ring including an outer ring defining an axis, an inner ring co-axial with the outer ring, a plurality of webbings connecting the inner ring to the outer ring, a plurality of vane engagement pins axially protruding from the outer ring, wherein the vane engagement pins are spaced circumferentially about the outer ring, and the inner ring comprises a drive ring bearing interface.

Also disclosed is a cabin air compressor including a compressor inlet, a compressor outlet fluidly connected to the compressor inlet via a passage, a plurality of rotatable diffuser vanes positioned in the passage, a drive ring connected to each of the rotatable diffuser vanes via a plurality of engagement pins, wherein the drive ring is controllably coupled to an actuator such that the actuator can rotate the drive ring thereby adjusting a cross sectional area of the rotatable diffuser vanes relative to gas flowing through the passage, wherein the cabin air compressor further includes a cabin air compressor drive ring having, an outer ring defining an axis, an inner ring co-axial with the outer ring, a plurality of webbings connecting the inner ring to the outer ring, the plurality of vane engagement pins axially protruding from the outer ring, wherein the vane engagement pins are spaced circumferentially about the outer ring, and the inner ring include a drive ring bearing interface.

These and other features of the present invention can be best understood from the following specification and drawings, the following of which is a brief description.

BRIEF DESCRIPTION OF THE DRAWINGS

FIG. 4 illustrates a radially outward facing partial internal view of an inner diameter of the drive ring of FIG. 2.

FIG. 5 illustrates a cross sectional side view of a drive ring bearing interface of the drive ring of FIG. 2.

DETAILED DESCRIPTION OF AN EMBODIMENT

Figure 1:
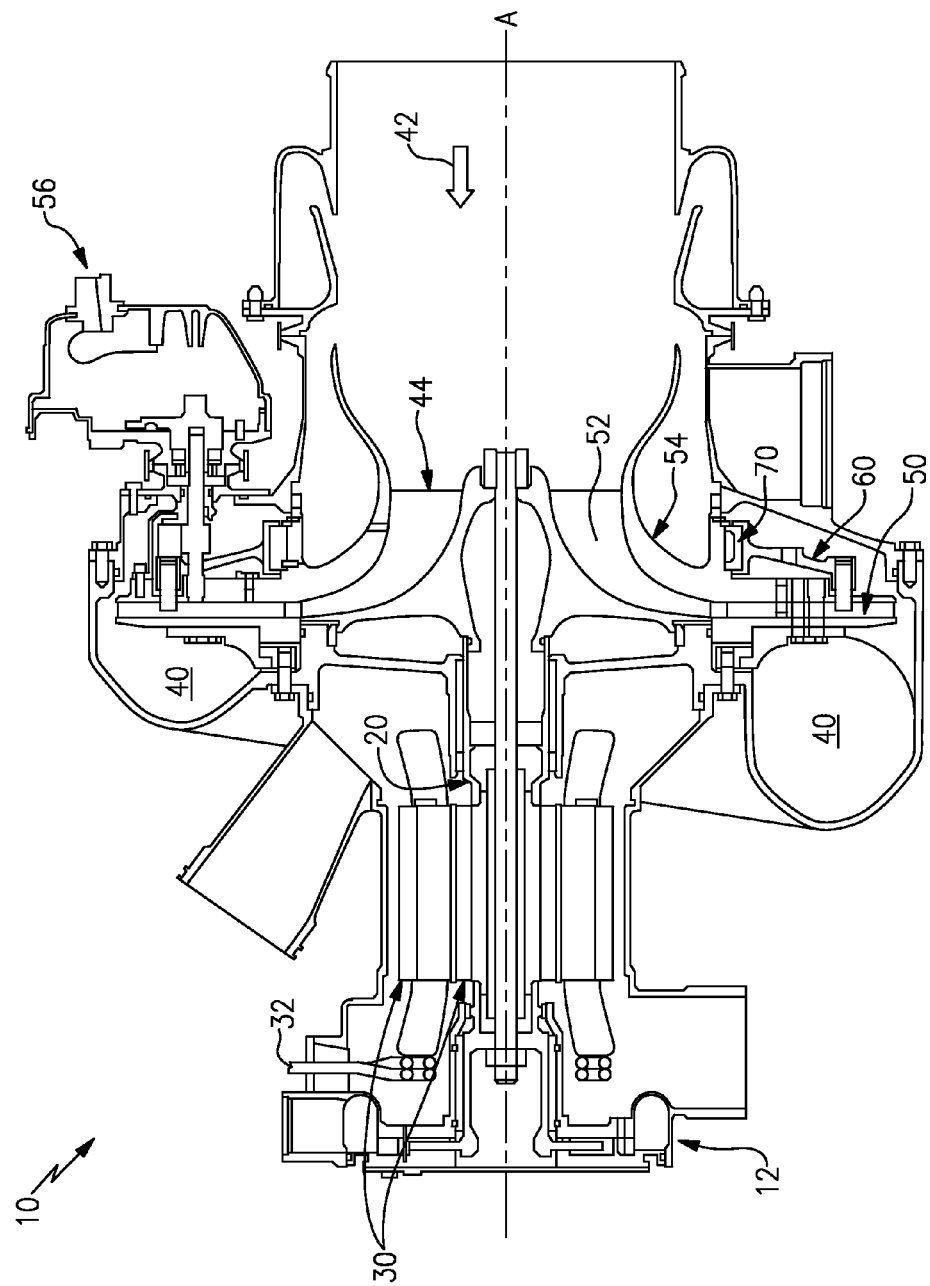
FIG. 1 illustrates a cross sectional view of an example cabin air compressor.

FIG. 1 illustrates a cabin air compressor 10 for use in a commercial aircraft. The cabin air compressor 10 has a compressor shaft 20 running through the center of the compressor 10 and defining an axis A. The shaft 20 is connected on one end to an electric stator/rotor arrangement 30 that receives electric power from a power input 32. The electric stator/rotor arrangement 30 converts the input electric power into rotational motion using standard motor means and imparts the rotational movement onto the shaft 20. The electric stator/rotor arrangement 30 is contained within a motor housing 12 portion of the cabin air compressor 10.

A compressor impeller 44 draws air into the cabin air compressor 10 through an air inlet 42. The air is passed to a compressor outlet 40 through an air passage 52 defined by a passage wall 54 and the impeller 44. Between the end of the air passage 52 and the compressor outlet 40 are multiple diffuser vanes 50 spaced circumferentially about the axis A. Each of the diffuser vanes 50 is rotatable and the cross sectional area of each of the diffuser vanes 50, relative to gas flow through the air passage 52, changes depending on the particular rotation or orientation of the diffuser vane 50. The cross sectional area of the diffuser vanes 50, in turn, restricts or opens the connection between the air passage 52 and the compressor outlet 40, thereby controlling a volume of gas flowing through the cabin air compressor 10 at any given time.

Each of the diffuser vanes 50 is connected to a drive ring 60 that controls the rotational position of the diffuser vanes 50. The diffuser vanes 50 are connected to the drive ring 60 via multiple drive ring engagement pins (illustrated in FIGS. 2 and 3). The angular position (alternatively referred to as the clock position) of the drive ring 60 is controlled by a diffuser actuator 56 that rotates the drive ring 60. Due to the connection between the drive ring 60 and the diffuser vanes 50, the rotation of the drive ring 60 causes the diffuser vanes 50 to rotate and thereby restrict or open the connection between the airflow passage 52 and the compressor outlet 40.

The drive ring 60 is supported within the cabin air compressor 10 on a drive ring bearing 70. The drive ring bearing 70 provides a circular bearing track that is positioned around, and coaxial with, the axis A. The drive ring bearing 70 prevents the drive ring 60 from shifting out of position, while at the same time allowing the drive ring 60 to rotate about the axis A.

Figure 2:
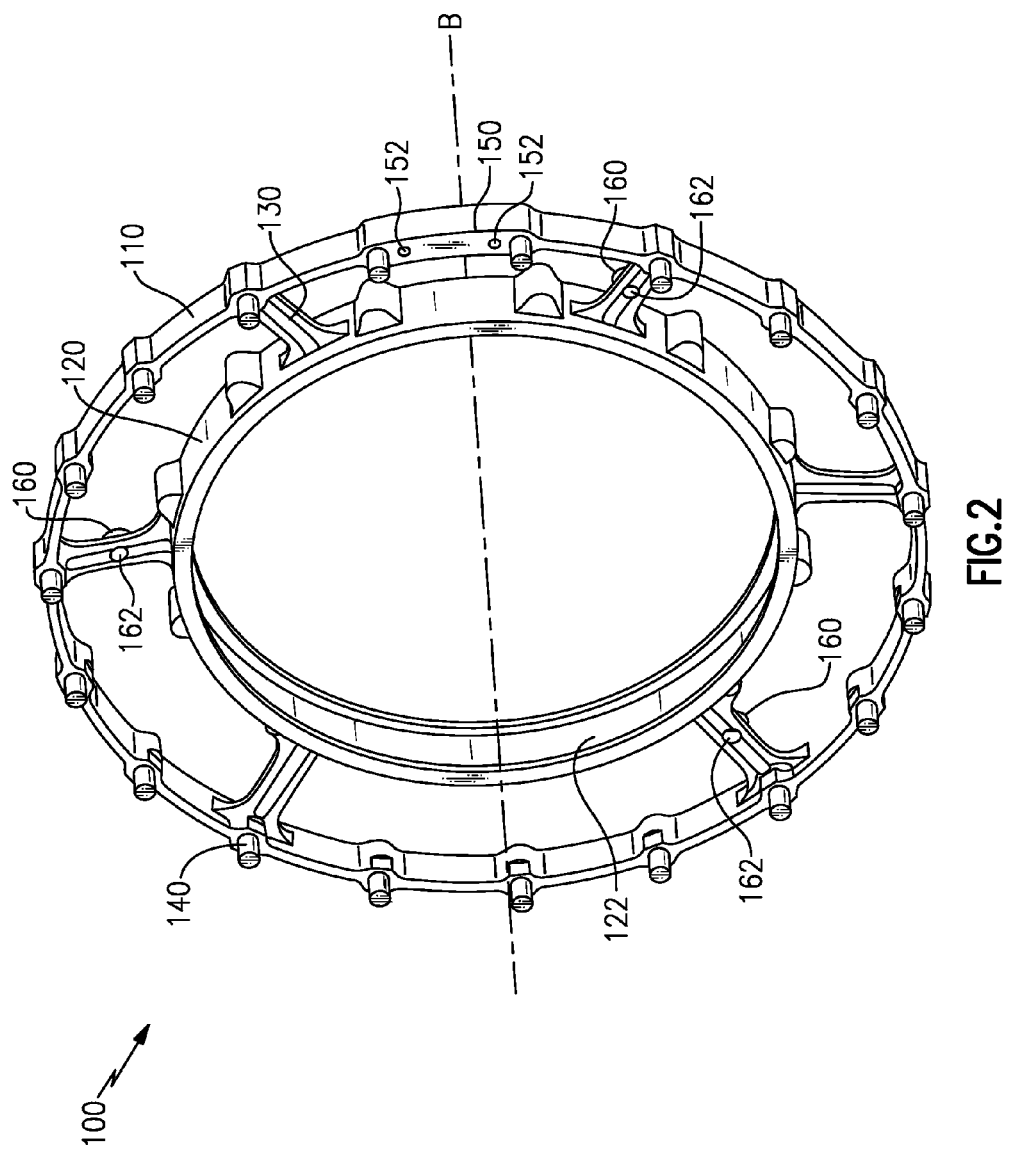
FIG. 2 illustrates an isometric view of a drive ring for an air compressor.

FIG. 2 illustrates an isometric view of a drive ring 100 for use as a diffuser vane drive ring in a cabin air compressor. The drive ring 100 has an outer ring 110 and an inner ring 120. The outer ring 110 and the inner ring 120 are connected via multiple webbings 130. In one example there are six webbings 130, and the webbings 130 are radially and symmetrically spaced about the inner ring 120 and the outer ring 110. Each of the inner ring 120 and the outer ring 110 are coaxial and define an axis B. In an installed configuration, such as the cabin air compressor 10 of FIG. 1, the axis B of the drive ring 100 and the axis A of the cabin air compressor shaft 20 are coaxial.

Evenly spaced about the circumference of the outer ring 110 are multiple diffuser vane engagement pins 140. Each of the engagement pins 140 is a cylindrical pin that extends from the outer ring 110 approximately parallel to the axis B. When the drive ring 100 is installed in the cabin air compressor 10, each of the engagement pins 140 engages with a diffuser vane. As a result of the engagement between the engagement pins 140 and the diffuser vanes, rotation of the drive ring 100 causes a corresponding rotation in the diffuser vanes as described above. A circle, referred to as the diametral centerline 144 (illustrated in FIG. 3), can be drawn connecting an axial center point of each engagement pin 140. The diametral centerline is coaxial with axis B.

The outer ring 110 further includes an actuator engagement section 150 that includes engagement features 152 for connecting the drive ring 100 to an actuator.

Three of the six illustrated webbings 130 of FIG. 2 include manufacturing features 160. The manufacturing features 160 include a hole 162 and a pad. The manufacturing features 160 are used for targeting/fixturing the drive ring 100 during manufacture. During casting, manufacturing features 160 are machined into the drive ring 100, and all casting inspections are from machined datums. When the drive ring 100 is machined, the drive ring 100 is clamped on the manufacturing features with intersecting pins inserted into the holes 162 for proper angular timing.

Figure 3:
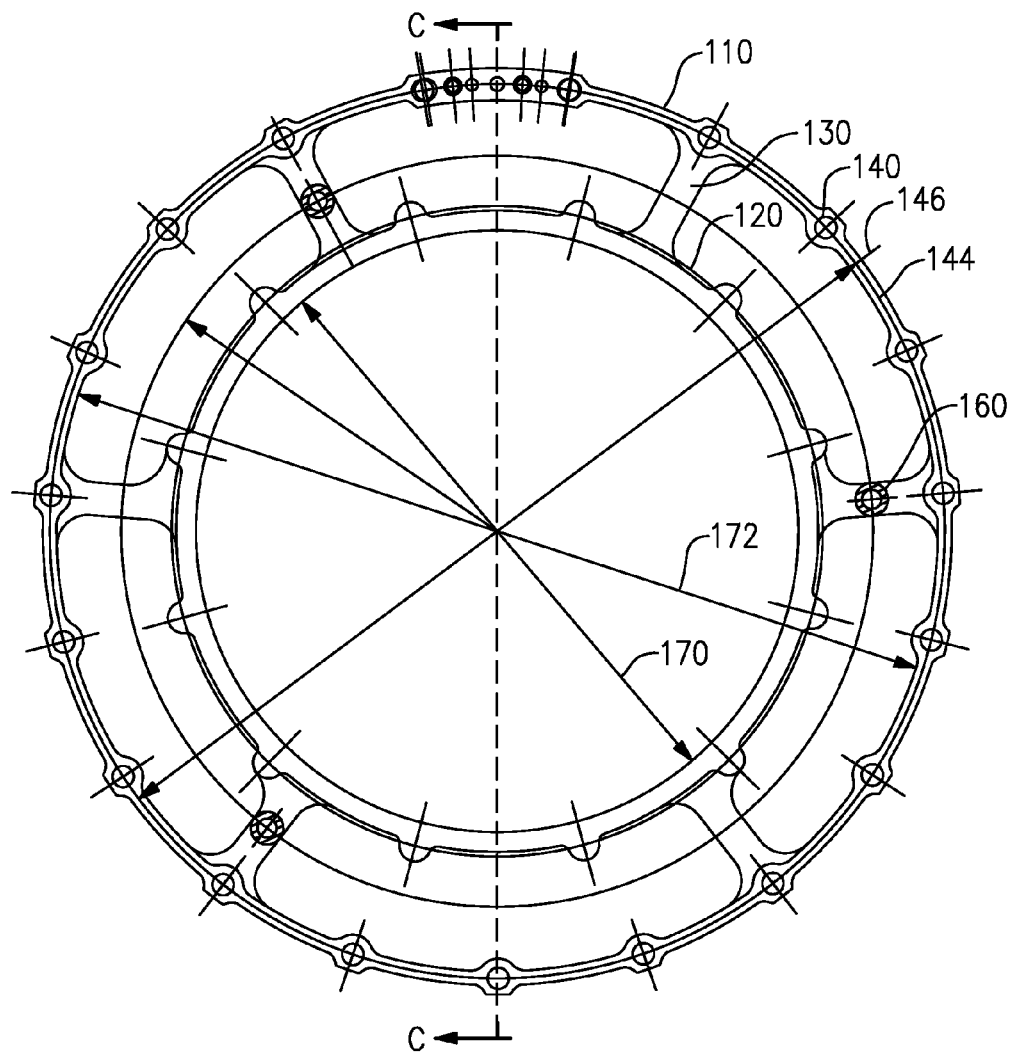
FIG. 3 illustrates a front view of the drive ring of FIG. 2.

With continued reference to FIG. 2, FIG. 3 illustrates a front view of the diffuser vane drive ring 100 of FIG. 2 with like numerals indicating like elements. As described previously, the drive ring 100 has an inner ring 120 and an outer ring 110. An inner diameter 172 of the outer ring 110 is measured from a radially innermost edge of the outer ring 110.

Similarly, an inner diameter 170 of the inner ring 120 is measured from a radially innermost edge of the inner ring 120. In one example the inner diameter 170 of the inner ring 120 is in the range of 10.395-10.405 inches (26.403-26.429 cm). In one example an inner diameter 172 of the outer ring 110 is in the range of 14.280-14.400 inches (36.271-36.576 cm). In one example a ratio of the inner diameter 170 of the inner ring 120 to the inner diameter 172 of the outer ring 110 is in the range of 10.395:14.400-10.405:14.280.

In one example, a diameter of the diametral centerline 144 of the engagement pins 140 is in the range of 15.435:15.465 inches (39.205-39.281 cm). In one example a ratio of the inner diameter 170 of the inner diameter ring 120 to the diameter 146 of the diametral centerline 144 is in the range of 10.405:15.435-10.395:15.465. In one example the ratio of the inner diameter 172 of the outer ring 110 to the diameter of the diametral centerline 144 is in the range of 14.400:15.435-14.280:15.465.

With continued reference to FIGS. 2 and 3, and with like numerals indicating like elements, FIG. 4 illustrates a radially outward facing partial internal view of the inner ring 120 and the outer ring 110 of the drive ring 100 of FIG. 2 along view line C-C. An inner surface 122 of the inner ring 120 of the drive ring 100 includes a track 126 for positioning the drive ring 100 on a drive ring bearing in the cabin air compressor, thereby allowing the drive ring 100 to rotate about the axis B and to be supported within the cabin air compressor.

The track 126 has two facing side walls 124, with each of the side walls 124 being approximately perpendicular to the axis B. The track 126 also includes a base 122 that is not aligned with the two facing side walls 124 and is approximately parallel with the axis B. A clearance cut 128 is cut into each corner where the two facing side walls 124 join the base wall 122. The inner diameter 170 of the inner ring 120 is measured from the innermost portions of the two facing sidewalls 124 as the innermost portions of the two facing side walls 124 are the radially innermost edge of the inner ring 120. A second, inner ring base diameter 174 is measured from the inner surface 122 of the base.

In one example the inner ring base diameter 174 is in the range of 10.801-10.805 inches (27.434-27.445 cm). In one example, the ratio of the inner ring base diameter 174 to the inner diameter 172 of the inner ring is in the range of: 10.801: 10.405-10.805:10.395.

In one example a ratio of the inner ring base diameter 174 to the inner diameter 172 of the outer ring 110 is 10.805: 14.280-10.801:14.400.

With continued reference to FIGS. 2-4, FIG. 5 illustrates a cross sectional side view of a bearing interface 180 for the drive ring 100 of FIG. 2. The two facing walls 124 of the drive ring bearing interface 180 define an axial interface length 182 of the shortest distance between the two facing walls 124. In one example, the axial interface length 182 of the drive ring bearing interface 180 is in the range of 1.002-1.004 inches (2.545-2.550 cm). The drive ring bearing interface 180 further defines a total axial bearing interface length 184. In one example the total axial bearing interface length 184 is in the range of 1.120-1.130 inches (2.844-2.870 cm).

As previously described, each of the facing side walls 124 includes a clearance cut 128 at a corner connecting the facing side wall 124 and the base surface 122. In one example, each of the clearance cuts 128 has a radial depth 187 into the base surface 122, relative to the axis B, in the range of 0.025-0.035 inches (0.0635-0.0889 cm). Each of the clearance cuts 128 also defines an axial cut 188 into the corresponding facing side wall 124. In one example, the axial cut 188 is in the range of 0.005-0.015 inches (0.0127-0.0381 cm). Each of the facing side walls 124 also defines an axial length 186 of the facing side wall 124. In one example, the axial length 186 of each facing side wall 124 is in the range of 0.115-0.125 inches (0.2921-0.3175 cm). In one example a ratio of the axial length cut 186 to the radial depth 187 is in the range of 0.005:0.035-0.015:0.025.

In one example a ratio of the axial length 182 of the bearing interface 180 to the axial length 182 of the base surface 122 is in the range of 1.120:1.004-1.130:1.006. In one example, a ratio of the axial length of each of the facing side walls 124 to the axial length 182 of the bearing interface 180 is in the range of 0.115:1.130-0.125:1.120.

In a practical implementation of the bearing interface 180 of FIG. 5, the base surface 122 and the two facing walls 124 are coated with a protective coating. In one example the protective coating is omitted from the clearance cuts 188.

While each of the above ratios and ranges are listed with regards to independent examples, it is understood that the benefits of each can be further achieved by combining the ranges and ratios into a single example utilizing multiple of the described features. The particular described ranges and ratios ensure that the diffuser drive ring 100 track 126 firmly connects to the bearing, but is still capable of rotating about the bearing.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A cabin air compressor drive ring comprising:
an outer ring defining an axis;
an inner ring co-axial with the outer ring said inner ring defining a bearing interface track operable to mount said drive ring to a cabin air compressor bearing, said bearing interface track comprising a first and second facing wall, each of said first and second facing walls are perpen- dicular to the axis, and a bearing interface base surface, said bearing interface base surface is parallel to the axis;

a plurality of webbings connecting the inner ring to the outer ring;

a plurality of vane engagement pins axially protruding from the outer ring, wherein said vane engagement pins are spaced circumferentially about the outer ring;

said inner ring comprises a drive ring bearing interface; and a first clearance cut protruding radially into said bearing interface base surface and axially into a first of said facing walls at a joint between said first of said facing walls and said bearing interface base surface.

2. The cabin air compressor drive ring of claim 1, wherein an axial length of each of the first and second facing walls is within the range of 0.115-0.125 inches (0.2921-0.3175 cm).

3. The cabin air compressor drive ring of claim 1, wherein an axial length of the bearing interface is in the range of 1.120-1.130 inches (2.8448-2.8702 cm).

4. The cabin air compressor drive ring of claim 1, wherein an axial length of the bearing interface base surface is in the range of 1.002-1.004 inches (2.545-2.550 cm).

5. The cabin air compressor drive ring of claim 1, wherein a ratio of an axial length of the bearing interface to an axial length of the bearing interface base surface is in the range of 1.120:1.004-1.130:1.002.

6. A cabin air compressor drive ring comprising:
an outer ring defining an axis;
an inner ring co-axial with the outer ring, the inner ring defines a bearing interface track operable to mount said drive ring to a cabin air compressor bearing, said bearing interface track comprises a first and second facing wall wherein each of said first and second facing walls are perpendicular to the axis, and a bearing interface base surface wherein said bearing interface base surface is parallel to the axis;
a plurality of webbings connecting the inner ring to the outer ring;
a plurality of vane engagement pins axially protruding from the outer ring, wherein said vane engagement pins are spaced circumferentially about the outer ring;
said inner ring comprises a drive ring bearing interface;
a first clearance cut protruding radially into said bearing interface base surface and axially into a first of said facing walls at a joint between said first of said facing walls and said bearing interface base surface;
a second clearance cut protruding radially into said bearing interface base surface and axially into a second of said facing walls at a joint between said second of said facing walls and said bearing interface base surface; and
wherein a ratio of said axial protrusion of each of said clearance cuts to said radial protrusion of each of said clearance cuts is in the range of 0.005:0.035-0.015:0.025.

7. The cabin air compressor drive ring of claim 1, wherein said outer ring defines an outer ring diameter measured from a radially innermost edge of the outer ring and said outer ring diameter is in the range of 14.280-14.400 inches (36.271-36.576 cm).

8. The cabin air compressor drive ring of claim 1, wherein said inner ring defines an inner ring diameter measured from a radially innermost edge of the inner ring and the inner ring diameter is in the range of 10.395-10.405 inches (26.403-26.429 cm).

9. The cabin air compressor drive ring of claim 1, wherein said outer ring defines an outer ring diameter measured from a radially innermost edge of the outer ring, said inner ring defines an inner ring diameter measure from a radially innermost edge of the inner ring and a ratio of said inner ring diameter to said outer ring diameter is in the range of 10.395:14.400-10.405:14.280.

10. The cabin air compressor drive ring of claim 1, wherein each of said plurality of vane engagement pins defines an engagement pin center point, a diametral circle connecting each of said engagement pin center point defines a diametral circle diameter of the outer diameter ring, and said diametral circle diameter is in the range of 15.435-15.465 inches (39.205-39.281 cm).

11. The cabin air compressor drive ring of claim 10, wherein said outer ring defines an outer ring diameter measured from a radially innermost edge of the outer ring and wherein a ratio of said diametral circle diameter to said outer ring diameter is in the range of 14.280:15.435-14.400:15.465.

12. A cabin air compressor comprising:
a compressor inlet;
a compressor outlet fluidly connected to the compressor inlet via a passage;
a plurality of rotatable diffuser vanes positioned in said passage;
a drive ring connected to each of said rotatable diffuse vanes via a plurality of engagement pins, wherein said drive ring is controllably coupled to an actuator such that said actuator can rotate said drive ring thereby adjusting a cross sectional area of said rotatable diffuser vanes relative to gas flowing through said passage;
wherein said drive ring further comprises
a cabin air compressor drive ring comprising:
an outer ring defining an axis;
an inner ring co-axial with the outer ring said inner ring defining a bearing interface track operable to mount said drive ring to a cabin air compressor bearing, said bearing interface track comprising a first and second facing wall, each of said first and second facing walls are perpendicular to the axis, and a bearing interface base surface, said bearing interface base surface is parallel to the axis;
a plurality of webbings connecting the inner ring to the outer ring;
said plurality of vane engagement pins axially protruding from the outer ring, wherein said vane engagement pins are spaced circumferentially about the outer ring;
said inner ring comprises a drive ring bearing interface; and
a first clearance cut protruding radially into said bearing interface base surface and axially into a first of said facing walls at a joint between said first of said facing walls and said bearing interface base surface.

13. The cabin air compressor of claim 12, wherein said cabin air compressor further includes a bearing track, and wherein said drive ring is mounted to said bearing track via a bearing track interface on a radially interior surface of said inner ring.

14. The cabin air compressor of claim 13, wherein said bearing track interface comprises a pair of facing side walls approximately perpendicular to said axis and base surface parallel to said axis, and said base surface defines an inner ring base diameter in the range of 10.801-10.805 inches (27.434-27.445 cm).

15. The cabin air compressor of claim 14, wherein a ratio of said inner ring base diameter to an inner ring diameter measured from an innermost surface of the pair of facing side walls is in the range of 10.801:10.405-10.805:10.395.

16. The cabin air compressor of claim 14, wherein a ratio of said inner ring base diameter to a diameter of a circle connecting an axial centerpoint of each of said engagement pins is in the range of 10.801:15.465-10.805:15.435.

17. The cabin air compressor of claim 12, wherein each of said engagement pins includes an axial center point, wherein a circle connecting each of said axial center points defines a diametral circle of said engagement pins, and a diameter of said diametral circle is in the range of 15.435-15.465 inches (39.205-39.281 cm).

18. The cabin air compressor of claim 1, further comprising a second clearance cut protruding radially into said bearing interface base surface and axially into a second of said facing walls at a joint between said second of said facing walls and said bearing interface base surface.

19. The cabin air compressor of claim 18, wherein a ratio of said axial protrusion of each of said clearance cuts to said radial protrusion of each of said clearance cuts is in the range of 0.005:0.035-0.015:0.025.

* * * * *